(12) United States Patent
Tsirkin

(10) Patent No.: US 11,327,783 B2
(45) Date of Patent: May 10, 2022

(54) ASYNCHRONOUS MANAGEMENT OF UNENCRYPTED MEMORY PAGE LIST OF A VIRTUAL MACHINE

(71) Applicant: RED HAT, INC., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 195 days.

(21) Appl. No.: 16/862,456

(22) Filed: Apr. 29, 2020

(65) Prior Publication Data
US 2021/0342172 A1 Nov. 4, 2021

(51) Int. Cl.
*G06F 9/455* (2018.01)
*G06F 12/14* (2006.01)
*G06F 12/1009* (2016.01)

(52) U.S. Cl.
CPC ...... *G06F 9/45558* (2013.01); *G06F 12/1009* (2013.01); *G06F 12/1408* (2013.01); *G06F 2009/4557* (2013.01); *G06F 2009/45575* (2013.01); *G06F 2009/45583* (2013.01); *G06F 2212/1052* (2013.01); *G06F 2212/151* (2013.01)

(58) Field of Classification Search
CPC ............. G06F 12/1009; G06F 12/1408; G06F 2212/1052; G06F 2212/151; G06F 9/45558; G06F 2009/4557; G06F 2009/45575; G06F 2009/45583
USPC .......................................................... 711/6
See application file for complete search history.

(56) References Cited

U.S. PATENT DOCUMENTS

| 10,303,899 | B2 | 5/2019 | Durham et al. |
| 2019/0065756 | A1 | 2/2019 | Tsirkin et al. |
| 2019/0068557 | A1 | 2/2019 | Noel et al. |
| 2019/0155728 | A1 | 5/2019 | Ferguson et al. |
| 2019/0171379 | A1* | 6/2019 | Van Riel ............ G06F 12/1408 |

OTHER PUBLICATIONS

Tadokoro H., Kourai K., Chiba S., "Preventing Information Leakage from Virtual Machines MEmory in IaaS Clouds", in Information and Media Technologies, vol. 7, No. 4, pp. 1421-1431 (Year: 2012).*

(Continued)

*Primary Examiner* — Reginald G Bragdon
*Assistant Examiner* — Aaron D Ho
(74) *Attorney, Agent, or Firm* — Lowenstein Sandler LLP

(57) ABSTRACT

Systems and methods for supporting asynchronous management of unencrypted memory pages of a virtual machine (VM) are disclosed. In one implementation, a processing device may receive, at a destination hypervisor of a host machine as part of a migration process of a VM, two copies of a memory page of the VM, the two copies comprising: a decrypted copy of the memory page, and an unencrypted copy of the memory page. The processing device may also cause the VM to execute a VM resume code, wherein executing the VM resume code comprises: determining whether the memory page is unencrypted based on a page table of the VM. Responsive to determining that the memory page is unencrypted, the processing device may copy the unencrypted copy of the memory page to a guest memory address.

20 Claims, 6 Drawing Sheets

(56) References Cited

OTHER PUBLICATIONS

Riteau P., Morin C., Pril T., "Shrinker: Improving Live Migration of Virtual Clusters over WANs with Distributed Data Deduplication and Content-Based Addressing," in: Jeannot E., Namyst R., Roman J. (eds) Euro-Par 2011 Parallel Processing, Lecture Notes in Computer Science, vol. 6852. Springer (Year: 2011).*

Umesh Deshpande, Xiaoshuang Wang, and Kartik Gopalan. 2011. Live gang migration of virtual machines. In Proceedings of the 20th international symposium on High performance distributed computing (HPDC '11). Association for Computing Machinery, New York, NY, USA, 135-146. (Year: 2011).*

Samer Al-Kiswany, Dinesh Subhraveti, Prasenjit Sarkar, and Matei Ripeanu. 2011. VMFlock: virtual machine co-migration for the cloud. In Proceedings of the 20th international symposium on High performance distributed computing (HPDC '11). Association for Computing Machinery, New York, NY, USA, 159-170. (Year: 2011).*

X. Zhang, Z. Huo, J. Ma and D. Meng, "Exploiting Data Deduplication to Accelerate Live Virtual Machine Migration," 2010 IEEE International Conference on Cluster Computing, 2010, pp. 88-96, doi: 10.1109/CLUSTER.2010.17. (Year: 2010).*

C. Li, A. Raghunathan and N. K. Jha, "A Trusted Virtual Machine in an Untrusted Management Environment," in IEEE Transactions on Services Computing, vol. 5, No. 4, pp. 472-483, Fourth Quarter 2012, doi: 10.1109/TSC.2011.30. (Year: 2012).*

Choudhary, A., Govil, M., Singh, G. et al. A critical survey of live virtual machine migration techniques. J Cloud Comp 6, 23 (2017). https://doi.org/10.1186/s13677-017-0092-1 (Year: 2017).*

F. Zhang, Y. Huang, H. Wang, H. Chen and B. Zang, "PALM: Security Preserving VM Live Migration for Systems with VMM-enforced Protection," 2008 Third Asia-Pacific Trusted Infrastructure Technologies Conference, 2008, pp. 9-18, doi: 10.1109/APTC.2008. 15. (Year: 2008).*

Y. Hu et al., "Performance Analysis of Encryption in Securing the Live Migration of Virtual Machines," 2015 IEEE 8th International Conference on Cloud Computing, 2015, pp. 613-620, doi: 10.1109/CLOUD.2015.87. (Year: 2015).*

Yubin Xia, Yutao Liu, Haibo Chen, "Architecture Support for Guest-Transparent VM Protection from Untrusted Hypervisor and Physical Attacks", http://class.ece.iastate.edu/tyagi/cpre581/papers/HPCA13VMProtection.pdf, Institute of Parallel and Distributed Systems, Shanghai Jiao Tong University, 2013.

David Kaplan, Jeremy Powell. Tom Woller, "AMD Memory Encryption", Advanced Micro Devices, Inc., https://developer.amd.com/wordpress/media/2013/12/AMD_Memory_Encryption_Whitepaper_v7-Public.pdf, Apr. 21, 2016, 12 pgs.

Mengyuan Li, Yinqian Zhang, Zhiqiang Lin, Yan Solihin, "Exploiting Unprotected I/O Operations in AMD's Secure Encrypted Virtualization", https://www.usenix.org/system/files/sec19-li-mengyuan_0.pdf, The Ohio State University; University of Central Florida, Aug. 14-16, 2019, pp. 1257-1272.

* cited by examiner

ASYNCHRONOUS MANAGEMENT OF UNENCRYPTED MEMORY PAGE LIST OF A VIRTUAL MACHINE

TECHNICAL FIELD

The disclosure is generally related to virtualization systems, and is more specifically related to asynchronous management of unencrypted memory page list of a virtual machine.

BACKGROUND

Virtualization is a computing technique that improves system utilization, decoupling applications from the underlying hardware, and enhancing workload mobility and protection. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, and so on.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
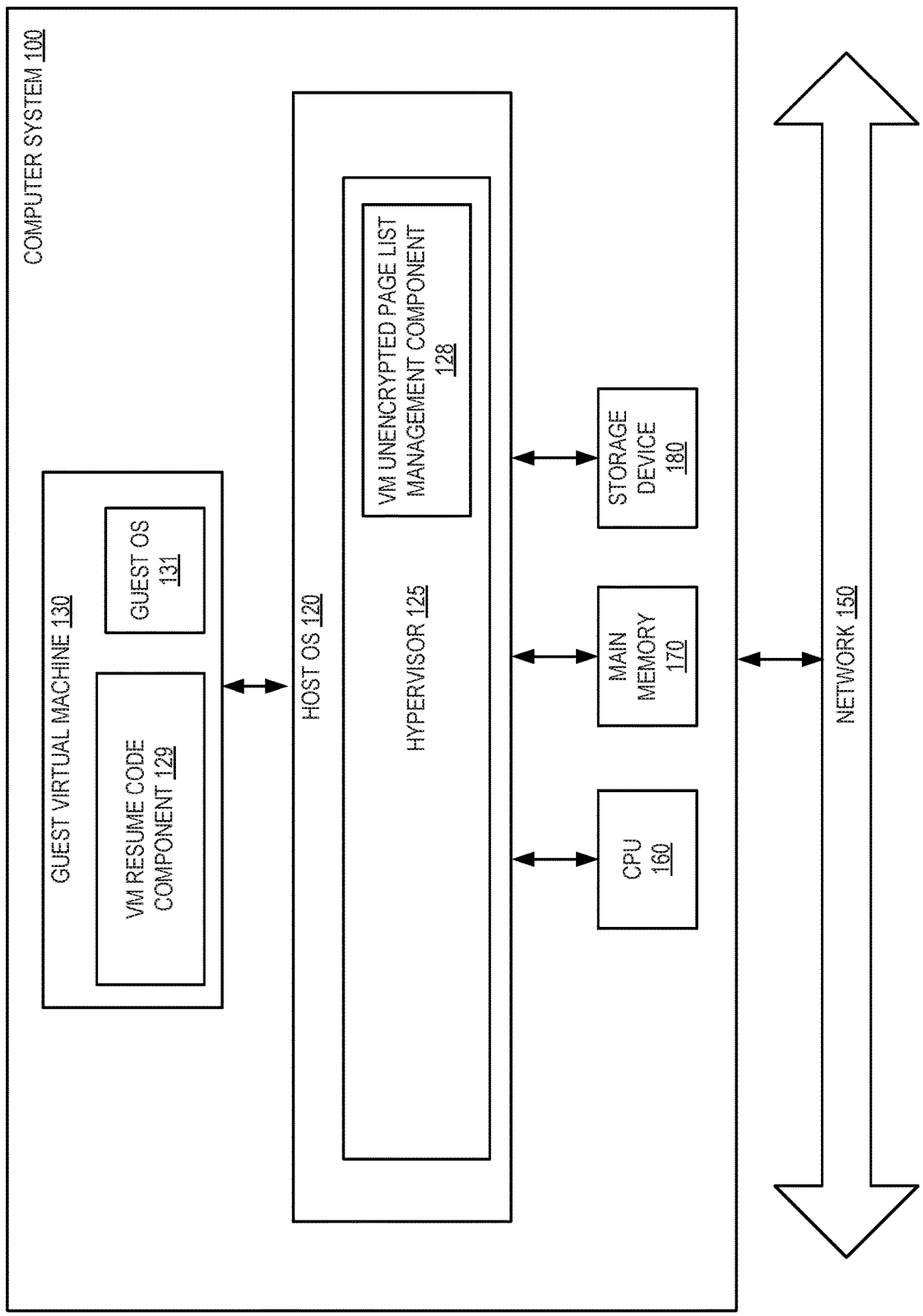
FIG. 1 depicts a high-level diagram of an example system architecture operating in accordance with one or more aspects of the disclosure.

Implementations of the disclosure are directed to asynchronous management of unencrypted memory page list of a virtual machine.

Certain processor architectures support virtualization by providing special instructions for facilitating virtual machine execution. In certain implementations, a processor may support executing a hypervisor that acts as a host and has full control of the processor and other platform hardware. A hypervisor presents a virtual machine with an abstraction of one or more virtual processors. A hypervisor is able to retain selective control of processor resources, physical memory, interrupt management, and input/output (I/O). Each virtual machine (VM) is a guest software environment that supports a stack consisting of operating system (OS) and application software. Each VM operates independently of other virtual machines and uses the same interface to the processors, memory, storage, graphics, and I/O provided by a physical platform.

The guest memory of a virtual machine can be encrypted by a host CPU in order to protect the guest memory from unauthorized access by the hypervisor. In this case, the encryption key can be derived from a host physical address of the host computer hosting the VM. When the guest memory is moved to a different host, e.g., as part of a migration process, the guest memory of the VM can be decrypted with the host-specific key and re-encrypted by an address-independent encryption key. The guest memory can then be re-encrypted with an address-specific encryption key at the destination host.

Since the VM communicates with the hypervisor frequently during execution, the VM will need to pass to the hypervisor and receive data from the hypervisor. For example, the VM can pass parameters to the hypervisor using a paravirtualized interface. The VM can similarly receive data from the hypervisor as a result of performing a certain operation (e.g., I/O operation and the like). The hypervisor thus needs to have access to some parts of the guest memory to facilitate these communication. For this reason, some memory pages of the VM are left unencrypted, in order to enable access to those memory pages by the hypervisor. In this case, the hypervisor can maintain a list of the memory pages of the VM that are unencrypted. This list, however, must be synchronized between the VM and the hypervisor at all times in order to avoid having the hypervisor decrypt an unencrypted page or read an encrypted page directly (assuming it is unencrypted), which might happen if the lists of unencrypted pages between the hypervisor and the VM are not synchronized with each other.

Conventionally, in order to avoid having the list of unencrypted memory pages on the VM mismatch the equivalent list on the host, the VM can be configured to notify the host of any change of an encryption status of a memory page, e.g., from unencrypted to encrypted and vice versa, so that the host can update its list of unencrypted memory pages accordingly. The VM can do that by using locks on the memory page while the hypervisor is notified of a change to the memory page, to prevent further changes to the encryption status of the memory page while the hypervisor is being notified. As the number of updates to the encryption status of the memory pages of the VM increases, the locking and updates from the VM to the hypervisor also increase, thus introducing significant latencies and overhead in the virtualization system. Additionally, a data structure that is used to store the list of unencrypted memory pages on the host can be difficult to scale sufficiently as the list of unencrypted memory pages grows.

Aspects of the disclosure address the above and other deficiencies by providing techniques for synchronizing the list of unencrypted memory pages on the host with the equivalent list of unencrypted pages on the guest VM, in order to improve the efficiency of managing the list unencrypted list of memory pages between the host and the VM. In accordance with aspects of the present disclosure, the synchronization of the two lists of unencrypted memory pages is performed when a VM is migrated to a host computer, in order to ensure that the hypervisor at the host computer system has a list of unencrypted memory pages of the VM that is synchronized with the list of the unencrypted memory pages in the guest physical memory.

In one implementation, the majority of the memory pages of the guest memory can be encrypted and only a small percentage of the memory pages are kept unencrypted (for example, to be used in communication with the hypervisor for sending a receiving data between the hypervisor and the VM). In this case, a memory page that is marked as unencrypted on the host may not necessarily be unencrypted in the guest physical memory, since the list of the unencrypted memory pages on the host is not yet synchronized with the list of unencrypted memory pages on the VM. Accordingly, the hypervisor on the source host can create two copies of each memory page that is marked as unencrypted on the host, one decrypted copy and one unencrypted copy, and can send both copies as part of the migration process to the destination host. The two copies can be validated using a VM page table after migration to determine whether the memory page is actually unencrypted or encrypted, and only one copy is mapped in the guest memory, while the other copy may be discarded, as explained in more details below.

The two copies of each memory page of the VM that is marked as unencrypted on the host consist of: a first copy that can be an unencrypted version of the memory page (i.e. can be read directly on the destination host), and a second copy that can be a decrypted memory page that is decrypted with an encryption key that is independent of the source host physical address. The source host can then send both copies of the memory page to the destination host as part of the migration process of the VM. In order to minimize the overhead of synchronizing the list of unencrypted memory pages during the VM migration, the source host is sending both an decrypted copy (assuming the page is encrypted) and an unencrypted copy (assuming the page is unencrypted) to the destination host. As an example, the unencrypted copy of the memory page can be stored at a memory location that is at a predetermined offset from the guest memory space. As explained below, when the migration process is complete, only one copy of the memory page can be kept in guest memory (based on an encryption status of the memory page in a VM page table) and the other copy can be discarded.

In one implementation, when the migration process of the VM completes, the hypervisor on the destination host can, before resuming the VM, cause the VM to execute a VM resume code, which scans the memory pages and determines whether each memory page is encrypted or unencrypted, based on the guest page table. Because the VM has control over switching a memory page from encrypted to an unencrypted status, and vice versa, the data structure can be used for tracking the up to date encryption status of each memory page of the VM. For example, the hypervisor can send an interrupt to the migrated VM requesting the VM to run the VM resume code. In an illustrative example, the VM resume code can look up memory pages that are marked as unencrypted (e.g., using a unique identifier of each memory page) in a VM page table. The VM resume code can then inspect an encryption flag associated with each memory page to find out if the memory page is encrypted or unencrypted. In one implementation, the VM resume code can be provided with a reference to the list of unencrypted memory pages as a parameter, such that the VM resume code can look up memory pages within the list, in order to eliminate the process of searching for memory pages that are marked as unencrypted.

In certain implementations, the VM can be resumed on the destination host without having to wait for the VM resume code to be completed. For example, the VM can be resumed on one vCPU while the VM resume code can be executing using another vCPU of the VM. In this case, the unencrypted copy of a memory page can be marked as inaccessible in a host page table, to prevent the vCPU executing the VM from accessing the unencrypted memory page. When the execution of the VM resume code is complete and the memory page is found to be unencrypted, the unencrypted copy of a memory page can be marked as accessible in the host page table.

When the VM resume code determines that a given memory page that is marked as unencrypted is in fact unencrypted (e.g., based on the encryption flag associated with the memory page in the VM page table), the VM resume code can copy the unencrypted copy of the memory page to the guest memory space from the memory location that is at the predetermined offset from the guest address space. The decrypted copy of the memory page that was migrated with the VM can then be discarded. On the other hand, if the VM resume code determines that the memory page that is marked as unencrypted is encrypted, based on the encryption flag associated with the memory page, the VM resume code can discard the unencrypted copy of the memory page. In this case, the decrypted copy of the memory page that is already located in the guest memory space is assumed to have the proper contents of the memory page.

In other implementations, if the majority of the VM memory pages are unencrypted and a small percentage of the memory pages are encrypted, the hypervisor can have a list of the encrypted memory pages that may not necessarily be in-sync with the list of encrypted memory pages on the VM. In this case, when the VM is migrated, instead of sending two copies of each memory page that is marked as unencrypted, the hypervisor can send two copies of the each memory page that is marked as encrypted on the source host. The first copy can be an unencrypted version of the memory page (i.e. can be read directly on the destination host). The second copy can be a decrypted memory page that is decrypted with an encryption key that is independent of the source host physical address. The source host can then send both copies of the memory page to the destination host as part of the migration process of the VM. In this case, the decrypted copy of the memory pages can be provided at a memory location that is at a predetermined offset form the guest memory address. The VM resume code can then look up each memory page that is marked as encrypted in the VM page table to determine whether the page is in fact encrypted. If a memory page is in fact encrypted, the decrypted copy of the memory page can be copied to the guest memory space from the memory location that is at the predetermined offset from the guest address space. The unencrypted copy pf the memory page that was migrated with the VM can then be discarded. On the other hand, if the VM resume code determines that the memory page that is marked as encrypted is unencrypted, based on the encryption flag associated with the memory page, the VM resume code can discard the decrypted copy of the memory page. In this case, the unencrypted copy of the memory page that is already located in the guest memory space is assumed to have the proper contents of the memory page.

Thus, implementations of the disclosure enables synchronizing the list of unencrypted memory pages of a virtual machine between the host and the VM to happen at migration time of the VM, thus shifting the performance penalty of synchronizing the two page lists to migration time of the VM, instead of happening in real time throughout the lifetime of the VM. This solution enables memory pages of the guest to switch from being encrypted to being unencrypted with high performance while eliminating the need to lock the unencrypted page list on the host when the list is being updated. Further, the list of unencrypted memory pages can be scaled dynamically on the VM as the number of unencrypted memory pages increases because the host does not need to be notified immediately as the number of unencrypted memory pages on the VM increase.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1. As shown in FIG. 1, the computer system 100 is connected to a network 150 and comprises central processing unit (CPU) 160, main memory 170, which can include volatile memory devices (e.g., random access memory (RAM)), non-volatile memory devices (e.g., flash memory), and/or other types of memory devices, and storage device 180 (e.g., a magnetic hard disk, a Universal Serial Bus (USB) solid state drive, a Redundant Array of Independent Disks (RAID) system, a network attached storage (NAS) array, etc.) that serves as a secondary memory, interconnected as shown. Although, for simplicity, a single CPU is depicted in FIG. 1, in some other embodiments computer system 100 can comprise a plurality of CPUs. Similarly, in some other embodiments computer system 100 can comprise a plurality of storage devices 180, rather than a single storage device 180. The computer system 100 can be a server, a mainframe, a workstation, a personal computer (PC), a mobile phone, a palm-sized computing device, etc. The network 150 can be a private network (e.g., a local area network (LAN), a wide area network (WAN), intranet, etc.) or a public network (e.g., the Internet).

Computer system 100 runs a host operating system (OS) 120, which can comprise software that manages the hardware resources of the computer system and that provides functions such as inter-process communication, scheduling, virtual memory management, and so forth. In some examples, host operating system 120 also comprises a hypervisor 125, which provides a virtual operating platform for guest virtual machine (VM) 130 and manages its execution. VM 130 can be software implementation of a machine that executes programs as though it were an actual physical machine. VM 130 can have a corresponding guest operating system 131 that manages virtual machine resources and provides functions such as inter-process communication, scheduling, memory management, and so forth. VM 130 can include VM resume code component 129 that may facilitate asynchronous management of unencrypted memory pages of the VM. Although, for simplicity, a single VM is depicted in FIG. 1, in some other embodiments computer system 100 can comprise a plurality of VMs. It should be noted that in some other examples, hypervisor 125 can be external to host OS 120, rather than embedded within host OS 120. As shown, hypervisor 125 can include VM unencrypted page list management component 128 that may facilitate asynchronous management of unencrypted memory pages of the VM.

In certain implementations, VM unencrypted page list management component 128 can receive two copies of each memory page of VM 130 that is marked as unencrypted on a source host, as part of a migration process of VM 130 to host system 100. The first copy can be an unencrypted version of the memory page and the second copy can be a decrypted memory page. In an illustrative example, the unencrypted copy of the memory page can be provided at a memory location that is at a predetermined offset from the guest memory space. In one implementation, when the migration process of VM 130 completes, and before resuming VM 130 on host system 100, VM unencrypted page list management component 128 can notify VM 130 to execute a VM resume code to determine whether the memory page is encrypted or unencrypted, based on a data structure within the guest memory space of VM 130. For example, VM unencrypted page list management component 128 can send an interrupt to VM 130, causing VM resume code component 129 of VM 130 to execute a VM resume code. In an illustrative example, VM resume code component 129 can look up memory pages that are marked as unencrypted (e.g., using a unique identifier of each memory page) in a VM page table. VM resume code component 129 can then inspect an encryption flag associated with the memory page to find out if the memory page is encrypted or unencrypted.

In one implementation, VM unencrypted page list management component 128 can resume VM 130 on host system 100 without having to wait for the VM resume code to be completed. For example, VM 130 can be resumed on one vCPU while the VM resume code can be executing using another vCPU of VM 130. In this case, the unencrypted copy of a memory page can be marked as inaccessible in a host page table, to prevent the vCPU executing VM 130 from accessing the unencrypted memory page. When the execution of the VM resume code is complete and the memory page is found to be unencrypted, the unencrypted copy of a memory page can be marked as accessible in the host page table.

When VM resume code component 129 determines that the memory page that is marked as unencrypted is in fact unencrypted (e.g., based on the encryption flag associated with the memory page in the VM page table), VM resume code component 129 can copy the unencrypted copy of the memory page to the guest memory space of VM 130 from the memory location that is at the predetermined offset from the guest address space. The decrypted copy pf the memory page that was migrated with VM 130 can then be discarded. On the other hand, if VM resume code component 129 determines that the memory page that is marked as unencrypted is encrypted, based on the encryption flag associated with the memory page, VM resume code component 129 can discard the unencrypted copy of the memory page. In this case, the decrypted copy of the memory page that is already located in the guest memory space of VM 130 is the only copy of the memory page that is present in the guest memory space of VM 130.

Figure 2:
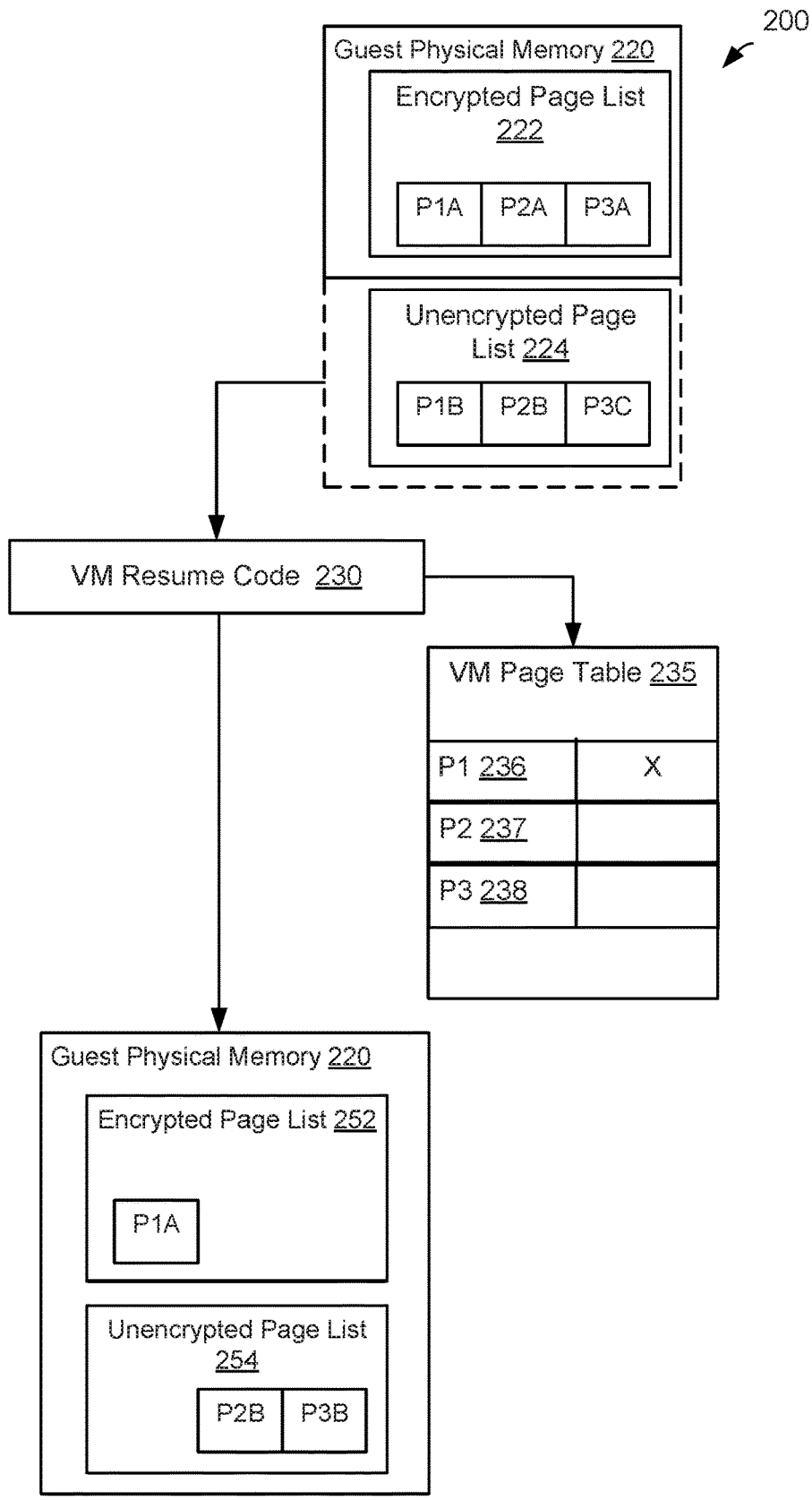
FIG. 2 depicts a block diagram of a method illustrating the asynchronous management of unencrypted memory pages of a VM after migration, in accordance with one or more aspects of the present disclosure.

FIG. 2 depicts a block diagram of a method 200 illustrating the asynchronous management of unencrypted memory pages of a VM after migration, in accordance with one or more aspects of the present disclosure. Method 200 may be performed by processing logic that includes hardware (e.g., circuitry, dedicated logic, programmable logic, microcode, etc.), software (e.g., instructions run on a processor to perform hardware simulation), or a combination thereof. Method 200 or each of its individual functions, routines, subroutines, or operations may be performed by one or more processors of a computer system (e.g., host computer system 100 of FIG. 1) implementing the method. In an illustrative example, method 200 may be performed by a single processing thread. Alternatively, method 200 may be performed by two or more processing threads, each thread implementing one or more individual functions, routines, subroutines, or operations of the method. In an illustrative example, the processing threads implementing method 200 may be synchronized (e.g., using semaphores, critical sections, or other thread synchronization mechanisms).

When a virtual machine (VM) is migrated to a host computer system, guest physical memory 220 of the VM can include encrypted page list 222, comprising the list of memory pages that are marked at encrypted by the source host from which the VM was migrated. As part of the migration process of the VM, unencrypted memory page list 224 can be provided to the VM at an offset from the guest memory space. In one implementation, the hypervisor at the source host provide two copies of each of memory pages P1, P2, and P3 that are marked as unencrypted on the host. The first set of copies can be P1A, P2A, and P3A representing decrypted copies of memory pages P1, P2, and P3 respectively. P1A, P2A, and P3A can reside in encrypted page list 222 and can be decrypted with an encryption key that is derived from a host physical address. The second set of copies can be P1B, P2B, and P3B representing unencrypted copies of memory pages P1, P2, and P3 respectively. P1B, P2B, and P3B can reside in unencrypted page list 224 and can be read directly by the host or the VM without a need for decryption. In implementations, the two set of copies of P1, P2, and P3 can be consolidated using VM resume code 230, such that only one copy of each of P1, P2, and P3 is kept in guest physical memory 220.

After the completion of the migration process, VM resume code 230 can be executed by the VM in order to determine whether each of P1, P2, and P3 is encrypted or unencrypted based on an encryption status of each of P1, P2, and P3 in VM page table 235. For example, VM resume code 230 can locate record 236 that is associated with P1 in VM page table 235. VM resume code 230 can then determine that an encryption flag in record 236 is set, indicating that P1 is encrypted. Consequently, VM resume code 230 can discard the unencrypted copy P1B of P1 and keep the decrypted copy P1A of P1.

Similar to P1, VM resume code 230 can locate record 237 that is associated with P2 in VM page table 235. VM resume code 230 can then determine that an encryption flag in record 237 is not set, indicating that P2 is unencrypted. Consequently, VM resume code 230 can copy the unencrypted copy P2B of P2 into unencrypted page list 254 that is within guest memory 220. VM resume code 230 can then discard the decrypted copy P2A of P2, such that P2 has only one copy (P2B) in the guest memory 220.

A similar process can be applied to P3. VM resume code 230 can locate record 238 that is associated with P3 in VM page table 235. VM resume code 230 can determine that an encryption flag in record 238 is not set, indicating that P3 is unencrypted. Consequently, VM resume code 230 can copy the unencrypted copy P3B of P3 into unencrypted page list 254 that is within guest memory 220. VM resume code 230 can then discard the decrypted copy P3A of P3, such that P3 only has the unencrypted copy P3B in the guest memory 220. When VM resume code 230 completes the processing of all memory pages in unencrypted page list 224, unencrypted page list 224 can be released.

After the execution of VM resume code 230 is complete, guest memory 220 of the VM can have the updated encrypted page list 252 and unencrypted page list 254. In this case, each memory page that was marked as unencrypted on the host will have one copy in either encrypted page list 252 or unencrypted page list 254 (based on the value of the corresponding encryption flag of each page), and the second copy of each memory page that was received during migration will be discarded.

Figure 3:
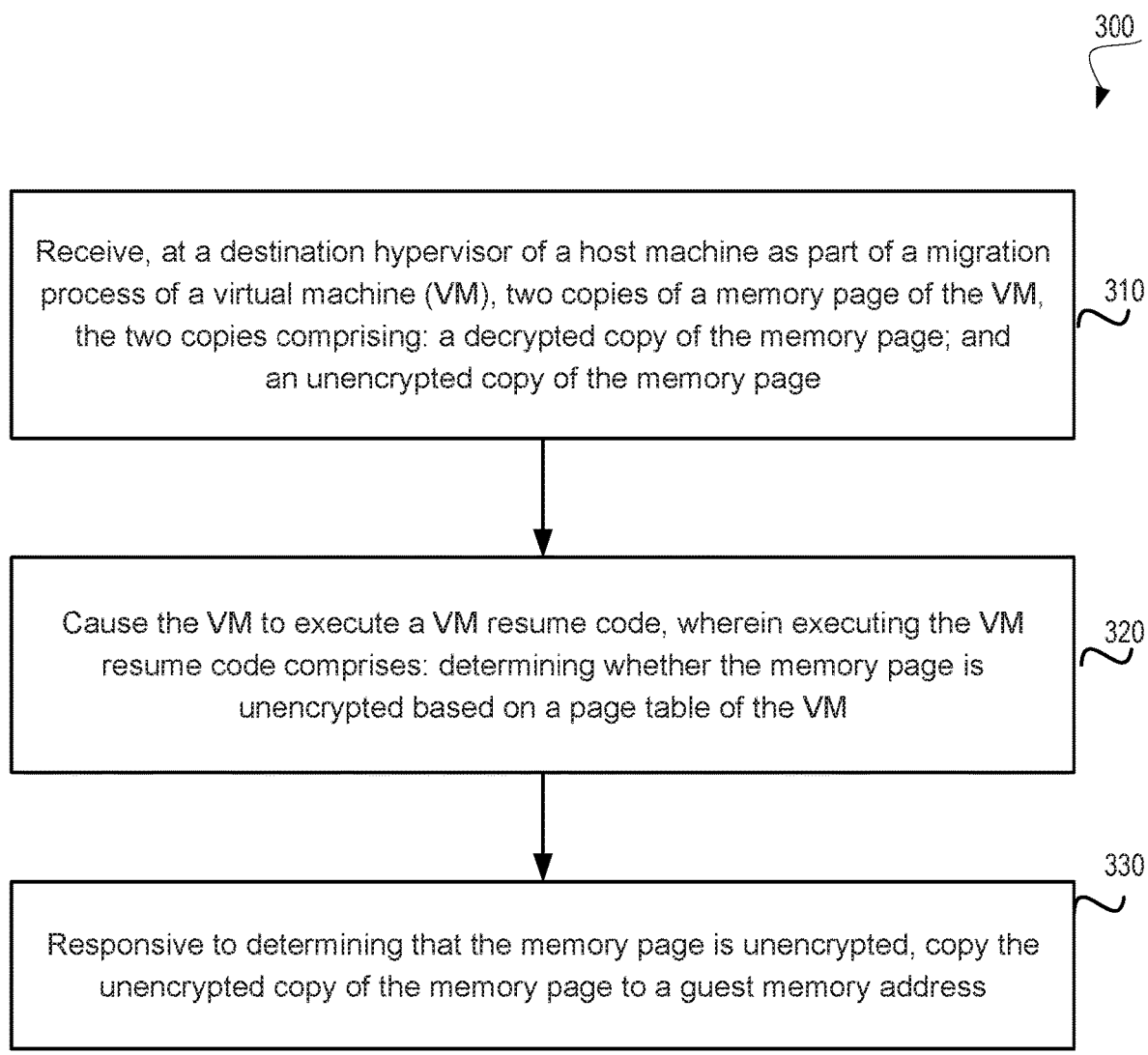
FIG. 3 is a flow diagram of an example method of managing unencrypted memory pages of a virtual machine during migration, in accordance with one or more aspects of the present disclosure.

FIG. 3 is a flow diagram of an example method of managing unencrypted memory pages of a virtual machine during migration, in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations may be performed by one or more processors of a computer system (e.g., the host computer system 100 of FIG. 1) implementing the method. In an illustrative example, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, or other thread synchronization mechanisms). Alternatively, the processing threads implementing method 300 may be executed asynchronously with respect to each other. Therefore, while FIG. 3 and the associated description lists the operations of method 300 in certain order, various implementations of the method may perform at least some of the described operations in parallel or in arbitrary selected orders.

Method 300 may begin at block 310. At block 310, during a migration process of a virtual machine (VM), the processing logic may receive, at a destination hypervisor of a host machine, two copies of a memory page of the VM; the first copy can be a decrypted copy of the memory page; and the second copy can be an unencrypted copy of the memory page. In implementations, the two copies of the memory page of the VM were created and sent to the processing logic because the memory page was marked as unencrypted at the source host of the migrated VM, as described in more detail herein above.

At block 320, the processing logic may cause the VM to execute a VM resume code to determine whether the memory page is unencrypted (thus the unencrypted copy of the memory page is kept and the decrypted copy is discarded), or encrypted (thus the decrypted copy of the memory page is kept and the unencrypted copy is discarded). In one implementation, the VM resume code may make this determination based on an encryption flag that is associated with the memory page in a VM page table, as explained in more details herein.

At block 330, when the processing logic determines that the memory page is unencrypted (e.g., based on the encryption flag that is associated with the memory page being unset), the processing logic can copy the unencrypted copy of the memory page into the guest memory space, so that it can be accessible by the VM and the hypervisor. In implementations, the processing logic may further discard the decrypted copy of the memory page from the guest memory space, as explained in more details herein above.

Figure 4:
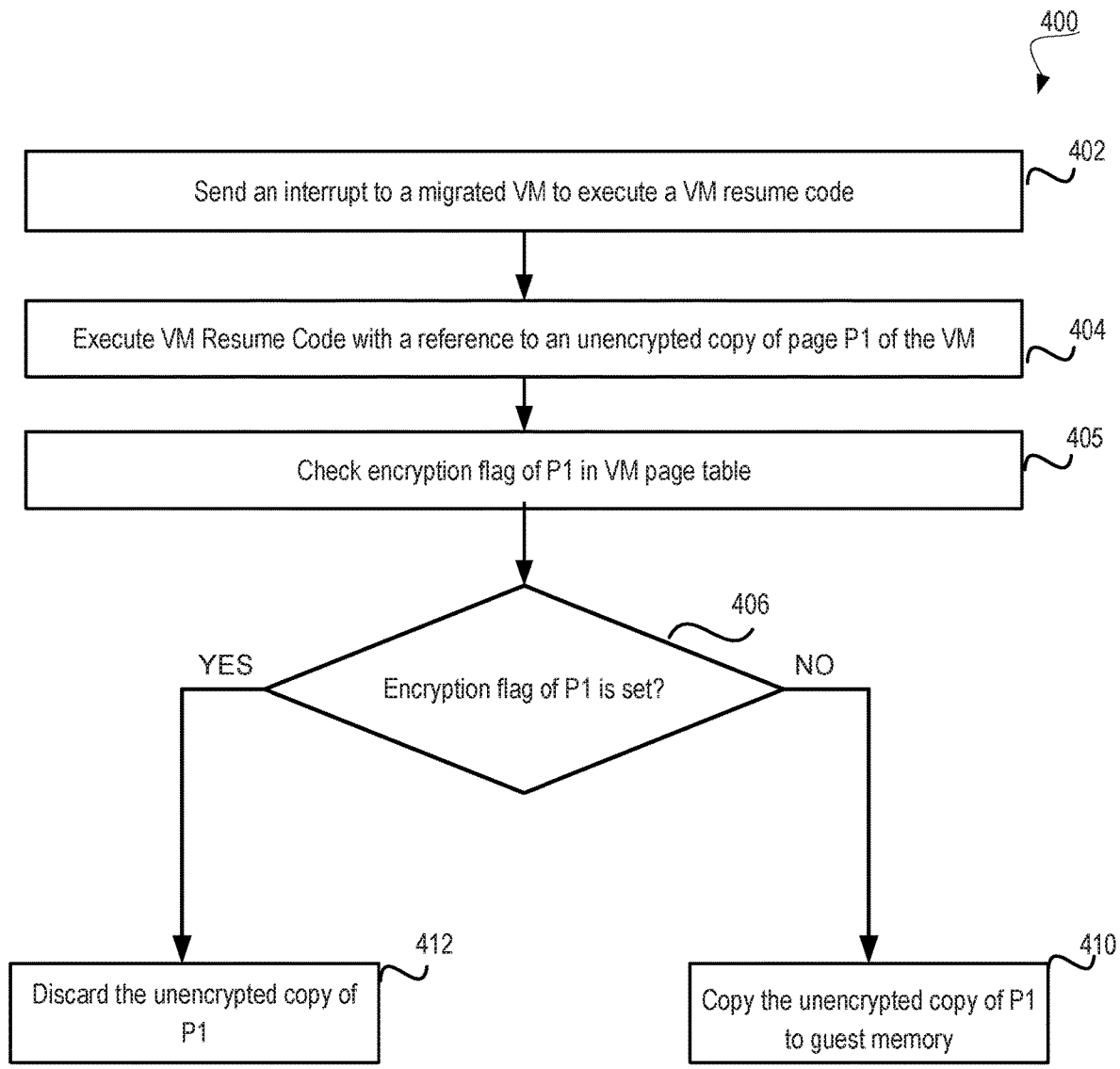
FIG. 4 is a flow diagram of an example method of synchronizing a list of unencrypted memory pages of a migrated virtual machine based on a VM page table, in accordance with one or more aspects of the present disclosure.

FIG. 4 is a flow diagram of an example method of synchronizing a list of unencrypted memory pages of a migrated virtual machine based on a VM page table, in accordance with one or more aspects of the present disclosure. Method 400 may be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations may be performed by one or more processors of a computer system (e.g., host computer system 100 of FIG. 1) implementing the method. In an illustrative example, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel or in arbitrary selected orders.

Method 400 may begin at block 402. At block 402, the processing logic may send an interrupt to a VM that has been migrated to a destination host computer. The interrupt may cause the VM to execute a VM resume code to determine whether a memory page of the VM that is marked as unencrypted on the source host is in fact unencrypted. In implementations, during the migration process of the VM, the processing logic may receive two copies of each memory page of the VM that is marked as unencrypted; one copy is unencrypted and the second copy is decrypted. The other memory pages of the VM may be assumed to be encrypted and may be migrated after being decrypted by the host, as described in more details here.

At operation 404, the processing logic may execute the VM resume code and may provide a reference to an unencrypted copy of memory page P1 as a parameter to the VM resume code. In implementations, the VM resume code may have access to a VM page table in the guest memory space, in order to validate the encryption status of P1 using a record of the VM page table that is associated with P1, as described in more details herein.

At operation 405, the VM resume code may look up a record associated with P1 in the VM page table and may inspect an encryption flag of the record that is associated with P1. In one implementation, each memory page of the VM may have a record in the VM page table, and each record may include an encryption flag that determines whether the memory page is encrypted or unencrypted (e.g., the memory page is encrypted if the flag is set and is unencrypted if the flag is unset).

At operation 406, the VM resume code may inspect the encryption flag associated with P1 to determine if P1 is encrypted or unencrypted. If the VM resume code determines that the encryption flag is set, the processing logic at operation 412 may determine that P1 is in fact encrypted. The VM resume code may then discard the unencrypted copy of P1. The VM resume code may further keep, in the guest memory space, the decrypted copy of P1 that was received during the migration process of the VM.

On the other hand, at operation 410, if the VM resume code determines that encryption flag is unset, the VM resume code may determine that P1 is in fact unencrypted. The VM resume code may then copy the unencrypted copy of P1 into guest memory space. The VM resume code may further discard the decrypted copy of P1 from the guest memory space, as explained in more details herein above.

Figure 5:
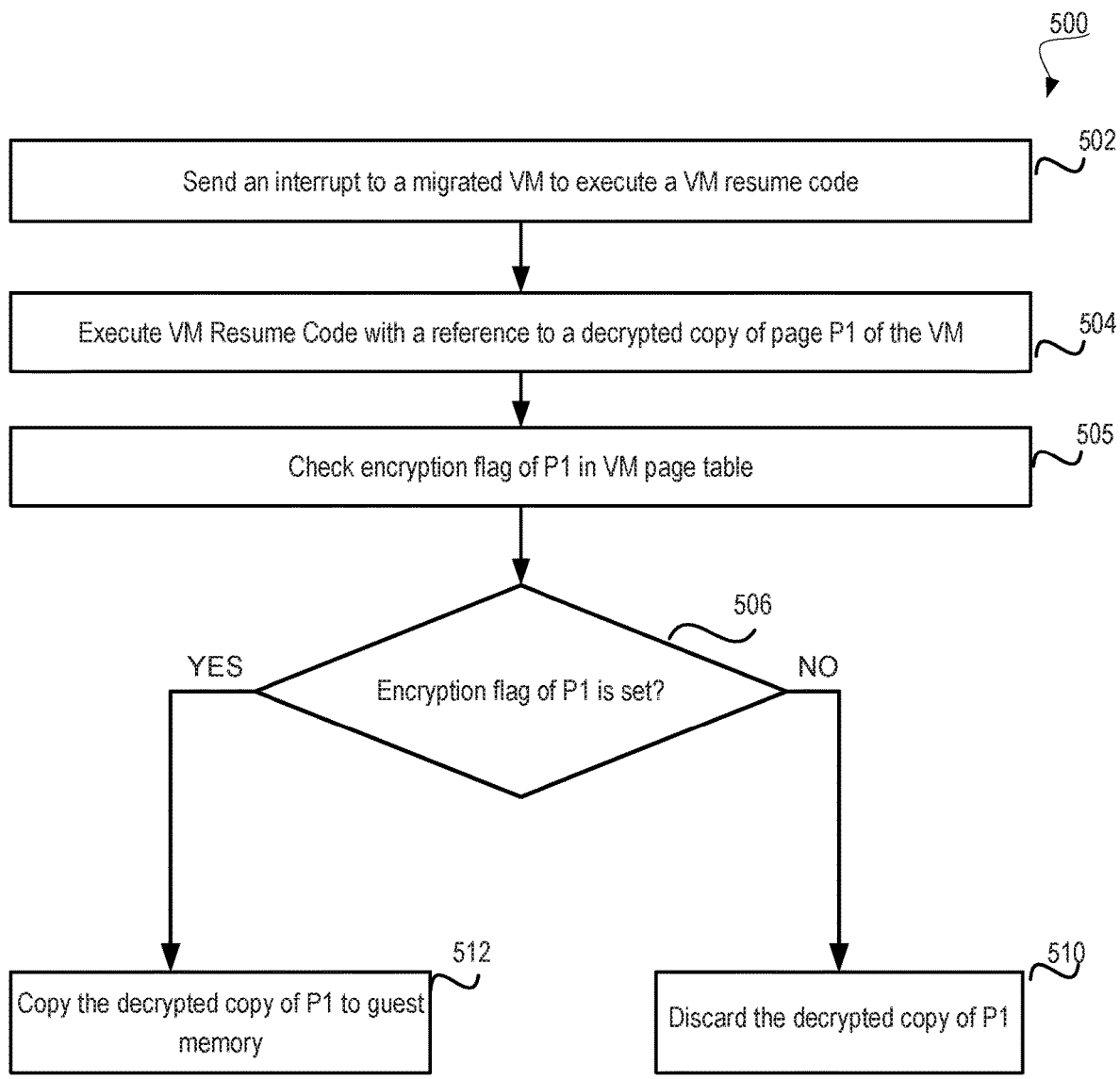
FIG. 5 is a flow diagram of an example method of synchronizing a list of encrypted memory pages of a migrated virtual machine based on a VM page table, in accordance with one or more aspects of the present disclosure.

FIG. 5 is a flow diagram of an example method of synchronizing a list of encrypted memory pages of a migrated virtual machine based on a VM page table, in accordance with one or more aspects of the present disclosure. Method 500 may be performed by processing logic that includes hardware (e.g., circuitry, dedicated logic, programmable logic, microcode, etc.), software (e.g., instructions run on a processor to perform hardware simulation), or a combination thereof. Method 500 or each of its individual functions, routines, subroutines, or operations may be performed by one or more processors of a computer system (e.g., host computer system 100 of FIG. 1) implementing the method. In an illustrative example, method 500 may be performed by a single processing thread. Alternatively, method 500 may be performed by two or more processing threads, each thread implementing one or more individual functions, routines, subroutines, or operations of the method. In an illustrative example, the processing threads implementing method 400 may be synchronized (e.g., using semaphores, critical sections, or other thread synchronization mechanisms). Alternatively, the processing threads implementing method 500 may be executed asynchronously with respect to each other. Therefore, while FIG. 5 and the associated description lists the operations of method 500 in certain order, various implementations of the method may perform at least some of the described operations in parallel or in arbitrary selected orders.

At block 502, the processing logic may send an interrupt to a VM that has been migrated to a destination host computer. The interrupt may cause the VM to execute a VM resume code to determine whether a memory page of the VM that is marked as encrypted on the source host is in fact encrypted. In implementations, during the migration process of the VM, the processing logic may receive two copies of each memory page of the VM that is marked as encrypted; one copy is unencrypted and the second copy is decrypted. The other memory pages of the VM may be assumed to be unencrypted and may be migrated by the host without decryption, as described in more details here.

At operation 504, the processing logic may execute the VM resume code and may provide a reference to a decrypted copy of memory page P1 as a parameter to the VM resume code. In implementations, the VM resume code may have access to a VM page table in the guest memory space, in order to validate the encryption status of P1 using a record of the VM page table that is associated with P1, as described in more details herein.

At operation 505, the VM resume code may look up a record associated with P1 in the VM page table and may inspect an encryption flag of the record that is associated with P1. In one implementation, each memory page of the VM may have a record in the VM page table, and each record may include an encryption flag that determines whether the memory page is encrypted or unencrypted (e.g., the memory page is encrypted if the flag is set and is unencrypted if the flag is unset).

At operation 506, the VM resume code may inspect the encryption flag associated with P1 to determine if P1 is encrypted or unencrypted. If the VM resume code determines that the encryption flag is set, the processing logic at operation 512 may determine that P1 is in fact encrypted. The VM resume code may then copy the decrypted copy of P1 into guest memory space. The VM resume code may further discard the unencrypted copy of P1 from the guest memory space, as explained in more details herein above.

On the other hand, at operation 510, if the VM resume code determines that encryption flag is unset, the VM resume code may determine that P1 is in fact unencrypted. The VM resume code may then discard the decrypted copy of P1. The VM resume code may further keep, in the guest memory space, the unencrypted copy of P1 that was received during the migration process of the VM.

Figure 6:
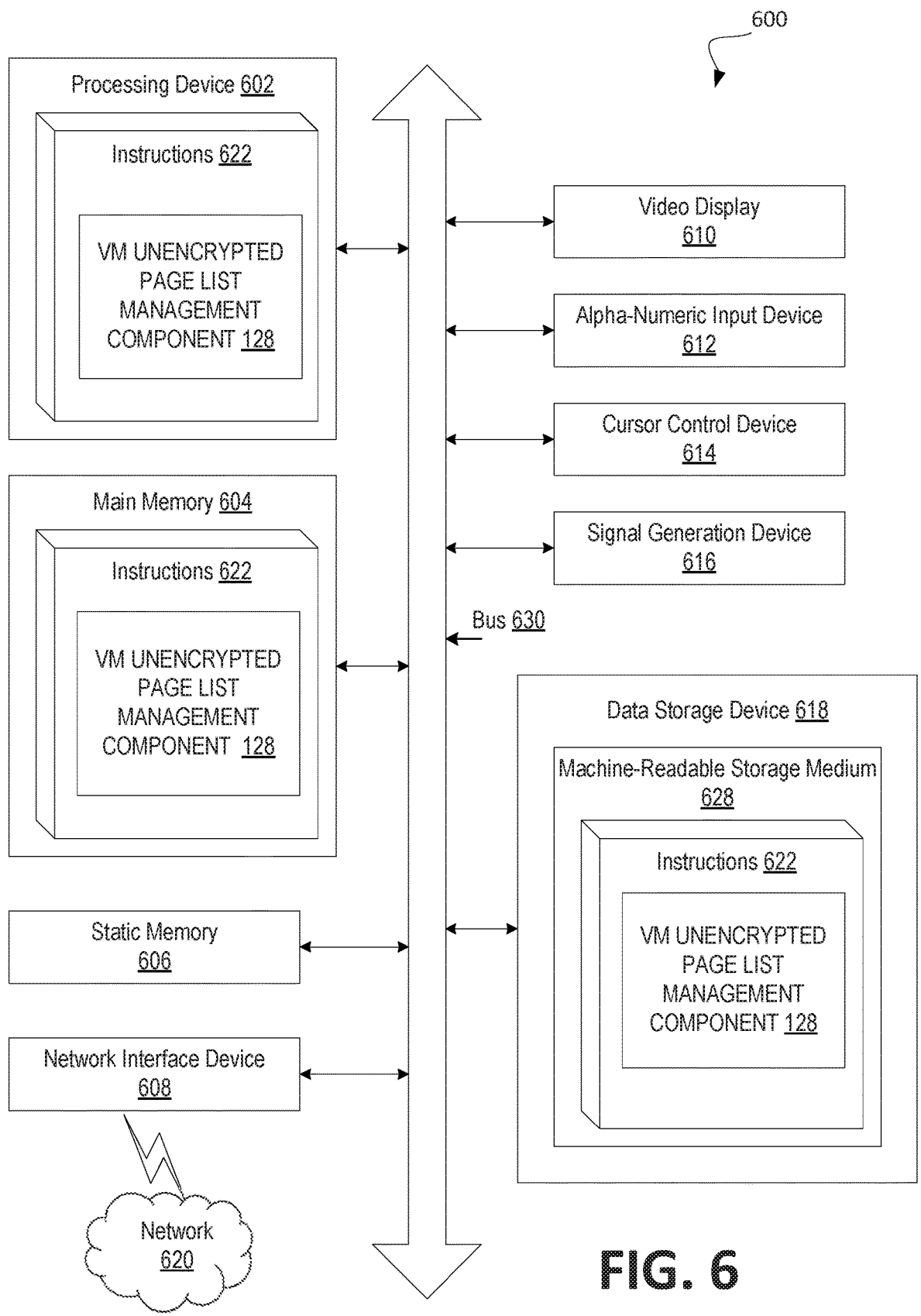
FIG. 6 depicts a block diagram of a computer system operating in accordance with one or more aspects of the disclosure.

FIG. 6 depicts a block diagram of a computer system operating in accordance with one or more aspects of the disclosure. In various illustrative examples, computer system 600 may correspond to a computing device 110 within system architecture 100 of FIG. 1. In one implementation, the computer system 600 may be the computer system 110 of FIG. 1. The computer system 600 may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 618, which may communicate with each other via a bus 630.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 608. Computer system 600 also may include a video display unit 610 (e.g., an LCD), an alpha-numeric input device 612 (e.g., a keyboard), a cursor control device 614 (e.g., a mouse), and a signal generation device 616.

Data storage device 618 may include a non-transitory computer-readable storage medium 628 on which may store instructions 622 embodying any one or more of the methodologies or functions described herein (e.g., VM unencrypted page list management component 128). Instructions 622 may also reside, completely or partially, within volatile memory 604 and/or within processing device 602 during execution thereof by computer system 600, hence, volatile memory 604 and processing device 602 may also constitute machine-readable storage media.

While computer-readable storage medium 628 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, and 400, and/or each of their individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
   receiving, at a destination hypervisor of a host machine as part of a migration process of a virtual machine (VM), two copies of a memory page of the VM, the two copies comprising:
      a decrypted copy of the memory page; and
      an unencrypted copy of the memory page;
   causing the VM to execute a VM resume code, wherein executing the VM resume code comprises:
      determining whether the memory page is unencrypted based on a page table of the VM; and
   responsive to determining that the memory page is unencrypted, copying the unencrypted copy of the memory page to a guest memory address.

2. The method of claim 1, wherein copying the unencrypted copy of the memory page further comprises:
   discarding the decrypted copy of the memory page.

3. The method of claim 1, wherein the unencrypted copy of the memory page is accessible by the hypervisor and is used for communication with the hypervisor.

4. The method of claim 1, wherein the decrypted page is decrypted with an address-independent encryption key.

5. The method of claim 1 further comprising:
   responsive to determining that the memory page is not unencrypted, discarding the unencrypted copy of the memory page.

6. The method of claim 1, wherein at least a subset of a plurality of memory pages of the VM are unencrypted.

7. The method of claim 1 further comprising:
   marking the unencrypted copy of the memory page as inaccessible in a host page table; and
   responsive to detecting that the VM resume code has been executed, marking the unencrypted copy of the memory page as accessible in the host page table.

8. The method of claim 1 further comprising:
   providing a reference of the unencrypted copy of the memory page as a parameter to the VM resume code.

9. The method of claim 1, wherein the unencrypted copy of the memory page is provided to the VM at an address that is located at a predetermined offset from the guest physical address space.

10. The method of claim 1 further comprising:
    responsive to detecting a completion of the migration process of the VM:
       sending an interrupt to the VM to execute the VM resume code; and
       resuming the VM on the host machine.

11. A system comprising:
    a memory;
    a processing device operatively coupled to the memory, the processing device to:
       receive, as part of a migration process of a virtual machine (VM), two copies of a memory page of the VM, the two copies comprising:
          a decrypted copy of the memory page; and
          an unencrypted copy of the memory page;
       cause the VM to execute a VM resume code, wherein executing the VM resume code comprises:
          determining whether the memory page is unencrypted based on a page table of the VM; and
       responsive to determining that the memory page is unencrypted, copy the unencrypted copy of the memory page to a guest memory address.

12. The system of claim 11, wherein to copy the unencrypted copy of the memory page, the processing device is further to:
    discard the decrypted copy of the memory page.

13. The system of claim 11, wherein the unencrypted copy of the memory page is accessible by a hypervisor and is used for communication with the hypervisor.

14. The system of claim 11, wherein the decrypted page is decrypted with an address-independent encryption key.

15. The system of claim 11, wherein the processing device is further to:
    responsive to determining that the memory page is not unencrypted, discard the unencrypted copy of the memory page.

16. The system of claim 11 wherein, responsive to detecting a completion of the migration process of the VM, the processing device is further to:
    send an interrupt to the VM to execute the VM resume code; and
    resume the VM on the host machine.

17. The system of claim 11, wherein the processing device is further to:
    mark the unencrypted copy of the memory page as inaccessible in a host page table; and
    responsive to detecting that the VM resume code has been executed, mark the unencrypted copy of the memory page as accessible in the host page table.

18. A non-transitory computer-readable media storing instructions that, when executed, cause a processing device to:
    receive, as part of a migration process of a virtual machine (VM), two copies of a memory page of the VM, the two copies comprising:
       a decrypted copy of the memory page; and
       an unencrypted copy of the memory page;
    cause the VM to execute a VM resume code, wherein executing the VM resume code comprises:
       determining whether the memory page is unencrypted based on a page table of the VM; and
    responsive to determining that the memory page is unencrypted, copy the unencrypted copy of the memory page to a guest memory address.

19. The non-transitory computer-readable media of claim 18, wherein the unencrypted copy of the memory page is provided to the VM at an address that is located at a predetermined offset from the guest physical address space.

20. The non-transitory computer-readable media of claim 18, wherein determining whether the memory page is unencrypted based on the page table of the VM further comprises:

inspecting, by the VM resume code, an unencrypted page flag in the VM page table, the unencrypted page flag is associated with the memory page.

\* \* \* \* \*